(12) United States Patent
Zhang et al.

(10) Patent No.: US 9,257,690 B2
(45) Date of Patent: Feb. 9, 2016

(54) ENERGY VEHICLE AND BATTERY LOCKING DEVICE THEREOF

(75) Inventors: Fan Zhang, Zhejiang (CN); Zhengxian Zheng, Zhejiang (CN); Xiaobin Lin, Zhejiang (CN); Guangbin Deng, Zhejiang (CN); Yongxia Dai, Zhejiang (CN)

(73) Assignees: HANGZHOU MUNICIPAL ELECTRIC POWER BUREAU, Hangzhou, Zhejiang (CN); STATE GRID CORPORATION OF CHINA, Beijing (CN); HANGZHOU DA YOU SCIENCE TECHNOLOGY DEVELOPMENT CO., LTD., Zhejiang (CN)

( * ) Notice: Subject to any disclaimer, the term of this patent is extended or adjusted under 35 U.S.C. 154(b) by 0 days.

(21) Appl. No.: 13/991,301

(22) PCT Filed: Jun. 20, 2012

(86) PCT No.: PCT/CN2012/077189
§ 371 (c)(1),
(2), (4) Date: Jun. 3, 2013

(87) PCT Pub. No.: WO2013/149438
PCT Pub. Date: Oct. 10, 2013

(65) Prior Publication Data
US 2015/0030899 A1    Jan. 29, 2015

(30) Foreign Application Priority Data

Apr. 5, 2012 (CN) .......................... 2012 1 0097944

(51) Int. Cl.
*H01M 2/10* (2006.01)

(52) U.S. Cl.
CPC ........ *H01M 2/1083* (2013.01); *H01M 2220/20* (2013.01)

(58) Field of Classification Search
CPC ....................... H01M 2/1083; H01M 2220/20
See application file for complete search history.

(56) References Cited

FOREIGN PATENT DOCUMENTS

| | | | |
|---|---|---|---|
| CN | 201777111 U | 3/2011 | |
| CN | 201887097 U | 6/2011 | |
| EP | 1 958 827 A1 | 8/2008 | |
| JP | 2011126396 A | 6/2011 | |
| RU | 2104182 * | 2/1998 | .............. B60R 16/04 |

OTHER PUBLICATIONS

International Search Report and Written Opinion (both in Chinese) for PCT/CN2012/077189, mailed Jan. 17, 2013; ISA/CN.

* cited by examiner

*Primary Examiner* — Helen O Conley
(74) *Attorney, Agent, or Firm* — Harness, Dickey & Pierce, P.L.C.

(57) ABSTRACT

A battery locking device for a new energy vehicle including: a battery compartment fit for a battery, the battery compartment being provided with a battery inlet; and a battery clamping device provided on the battery compartment and controlled by a linkage mechanism. Since the battery clamping device is controlled by the linkage mechanism, during the mounting or removing of the battery, the battery can be integrally clamped or released by merely operating an operating end of the linkage mechanism. Compared with the prior art in which the battery is fixed through bolts, the battery can be integrally clamped or released by the battery locking device through a single operation, which greatly simplifies the disassembling or assembling process of the battery and reduces the time required for replacing the battery. A new energy vehicle provided with the above battery locking device has the same advantages.

7 Claims, 3 Drawing Sheets

ENERGY VEHICLE AND BATTERY LOCKING DEVICE THEREOF

CROSS-REFERENCE TO RELATED APPLICATIONS

This application is the national phase of International Application No. PCT/CN2012/077189, titled "NEW ENERGY VEHICLE AND BATTERY LOCKING DEVICE THEREOF" and filed on Jun. 20, 2012, which claims the benefit of priority to Chinese Patent Application No. 201210097944.6, filed with the Chinese State Intellectual Property Office on Apr. 5, 2012 and entitled "NEW ENERGY VEHICLE AND BATTERY LOCKING DEVICE THEREOF", the entire disclosures of which are incorporated herein by reference.

FIELD OF THE INVENTION

The present application relates to the manufacturing technology field for the new energy vehicle, and particularly to a new energy vehicle and a battery locking device thereof.

BACKGROUND OF THE INVENTION

The crisis of fossil energy speeds up the step of the substitution of traditional energy by new energy, and the Electric energy, which is one of the clean energy, is widely used in various fields.

Presently, the electric automobile is available, which mainly uses a storage battery as the electric power carrier, such that the motor of the electric automobile is rotated under the discharging of the storage battery, the motor in turn drives the wheels to move the automobile.

The battery of the electric vehicle has a limited capacity, and thus the electric vehicle can only run for a limited mileage. Therefore it is necessary to set up charging stations on the road. However, it usually takes a long time to charge the battery, which is inconvenient for automobile users, especially for those who drive a bus mainly for passenger transportation. As a result, not only the driver's time but also the passengers' trips are delayed. It is relatively feasible to reserve fully-charged batteries in the charging stations, or to carry a spare battery in the automobile. Thus an electric automobile that needs to be charged can move forward after the battery thereof is replaced in the charging station or by the driver himself, which significantly saves the time for charging.

In the existing automobile, the battery is generally connected to the battery compartment in the automobile via bolt fixing devices, and it needs to disassemble all the bolts and fasten a new battery in the battery compartment via the bolts during the replacing of the battery. It is easier for an operator to assemble/disassemble bolts near the operator, while it is difficult for an operator to assemble/disassemble bolts away from the operator, and it is extremely inconvenient to assemble/disassemble bolts between the battery and the battery compartment, which kind of replacing manner is complicated and a long time is spent for the replacing operation.

Therefore, a technical problem needed to be solved by the person skilled in the art is how to disassemble/assemble the battery of the new energy vehicle quickly and save the time for replacing the battery.

SUMMARY OF THE INVENTION

An object of the present application is to provide a battery locking device for a new energy vehicle for rapidly disassembling or assembling the battery of the new energy vehicle and saving the time required for replacing the battery. Also, another object of the present application is to provide a new energy vehicle fitted with the battery locking device.

For solving the above technical problems in the prior art, it is provided according to the present application a battery locking device for a new energy vehicle including:

a battery compartment fit for a battery, the battery compartment being provided with a battery inlet; and a battery clamping device provided on the battery compartment and controlled by a linkage mechanism such that the battery is clamped or released.

Preferably, the battery compartment includes a side frame and a bottom plate provided at a bottom portion of the side frame.

Preferably, the battery clamping device includes two pressing plate linkage mechanisms provided on two sides of the battery inlet and a transmission rod connecting the pressing plate linkage mechanisms, the transmission rod is provided with a transmission gear, and the pressing plate linkage mechanisms include:

rotatable screw rods provided on parts of the side frame that are located at the two sides of the battery inlet or on the bottom plate, each rotatable screw rod is provided with a screw rod gear engaged with a transmission gear at an end of the transmission rod, and an end of at least one of the screw rods acts as a linkage mechanism operating end;

sliding rods, each of which is in proximity to a corresponding screw rod and is fixedly provided on the battery compartment;

sliding sleeves, each of which is sleeved on a corresponding screw rod through a threaded orifice and is sleeved on a corresponding sliding rod through a sliding rod-through hole simultaneously;

pressing plates, each of which is provided with a pressing edge folded towards inside of the battery compartment for pressing the battery, slidably mounted on the parts of the side frame that are located at the two sides of the battery inlet via pressing plate slideways through which the pressing plate are movable upwards and downwards; and connecting rods, one end of each connecting rod is articulated with corresponding pressing plate, and the other end thereof is articulated with corresponding sliding sleeve.

Preferably, the battery locking device further includes: a back stop member mounted on a part of the side frame that is located at a back side of the battery compartment, for preventing the battery from being exposed; and side stop members provided at two sides of the battery inlet and located at the back side of the battery compartment.

Preferably, the back stop member and the side stop members are angle steels which are rotatably connected to the side frame and have an inner angle of 90 degree, and springs are provided between the back stop member and the side frame as well as between each side stop member and the side frame.

Preferably, one end of each pressing slideway is in proximity to a top side of the battery compartment, and the other end thereof is extended downwards and inclined towards the back side of the battery compartment, and the pressing edge of the pressing plate includes an upper pressing edge for pressing an upper surface of the battery and a front pressing edge for pressing a front surface of the battery.

Preferably, transmission gears are provided on both ends of the transmission rod, the screw rod gear is provide on an end of the screw rod protruded to the back side of the battery compartment, and the linkage mechanism operating end is provided at one side of the battery inlet.

Preferably, the battery locking device further includes pushing guide wheels located at the two sides of the battery inlet and provided on the bottom plate.

Preferably, the battery locking device further includes elastic buffering members provided on the back stop member, the side stop members and pressing edges of the pressing plates.

It is further provided a new energy vehicle comprising a battery and a battery locking device for accommodating and locking the battery, and the battery locking device is the above battery locking device.

It can be concluded from the above technical solutions, the battery locking device for the new energy vehicle according to the present application includes a battery compartment fit for the battery and a battery clamping device provided on the battery compartment and controlled by a linkage mechanism. Since the battery clamping device is controlled by the linkage mechanism, during the mounting or removing of the battery, the battery can be integrally clamped or released by merely operating an operating end of the linkage mechanism. Compared with the prior art in which the battery is fixed through bolts, the battery can be integrally clamped or released by the battery locking device through a single operation, which greatly simplifies the disassembling or assembling process of the battery and reduces the time required for replacing the battery. The new energy vehicle with such a battery locking device has advantages, for example, it is convenient to replace the battery.

DETAILED DESCRIPTION

Figure 1:
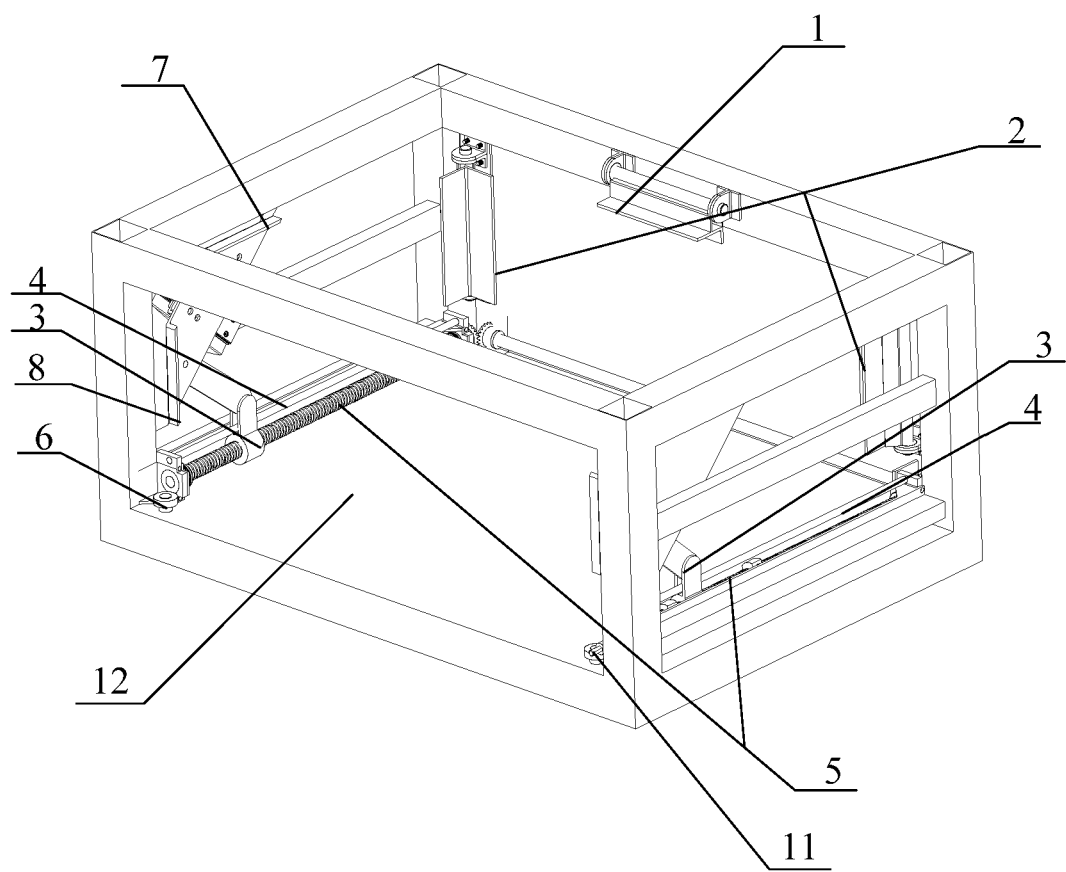
FIG. 1 is an overall schematic diagram showing a battery locking device for a new energy vehicle according to an embodiment of the present application.

An object of the present application is to provide a battery locking device for a new energy vehicle. In the battery locking device, a battery clamping device on the battery locking device is controlled by a linkage mechanism. Therefore the battery can be integrally clamped or released through a single operation, which effectively reduces the time required for replacing the battery. Another object of the present application is to provide a new energy vehicle with the battery clamping device.

In order that those skilled in the art can better understand solutions of the present application, the present application will be illustrated in detail in conjunction with the accompanying drawings and embodiments.

In the present application, the new energy vehicle mainly refers to the electric vehicle or a hybrid electrical vehicle having a battery. The present application is also applicable to a fuel vehicle with a battery. The battery locking device according to embodiments of the present application is applicable to the large vehicle, such as a bus, and the small or micro vehicle in the new energy vehicle. The battery locking device according to embodiments of the present application includes a battery compartment and a battery clamping device which is mounted on the battery compartment and controlled by a linkage mechanism. The battery compartment is configured to accommodate a battery and includes a battery inlet 12. The side of the battery compartment opposite to the battery inlet 12 is named as a back side of the battery compartment, and the side on which the battery inlet 12 is provided is named as a front side of the battery compartment. The battery compartment is fit for the battery to be mounted in the new energy vehicle in which the battery compartment is provided. The battery clamping device controlled by the linkage mechanism is configured to integrally clamp the battery, so as to ensure that the battery would not become loose during the running of the new energy vehicle.

The linkage mechanism of the battery clamping device may include one or more operating ends. In operation, the battery can be integrally clamped or released by merely controlling one of the operating ends. The linkage mechanism may include a plurality of battery clamping sheets connected via connecting rods, so as to achieve the clamping or releasing operations of the plurality of battery clamping sheets simultaneously by the operating end of the linkage mechanism. Alternatively, a cam structure may be employed, for example, a rotatable cam rod mounted at the bottom portion of the battery compartment and a cam mounted on the cam rod may be employed to achieve the simultaneous upward or downward movements of the battery clamping sheets on the two sides, and cam rods on the other two sides is driven by the cam cod via a gear, thereby the battery clamping sheets on the four sides can be moved synchronously. Alternatively, the linage mechanism includes a screw rod and a gear such that the multiple battery clamping sheets are clamped or released simultaneously.

With the battery clamping device controlled by the linkage mechanism, the battery can be integrally clamped or released through a single operation. In comparison, in the prior art, the battery is fixed in the battery compartment via bolts, in the replacing of the battery, it needs to remove the bolts one by one; while after the battery is placed in the battery compartment, it needs to screw the bolts one by one. Thereby it can be concluded that the battery locking device according to the embodiments of the present application can effectively save the time required for replacing the battery.

In order to save the material and reduce the production cost and the overall weight of the vehicle, the battery compartment according to the present embodiment includes a side frame and a bottom plate provided at the bottom portion of the side frame. The bottom plate is configured to bear the overall weight of the battery. The side frame is configured for limiting the displacement of the battery and mounting the clamping device.

Figure 2:
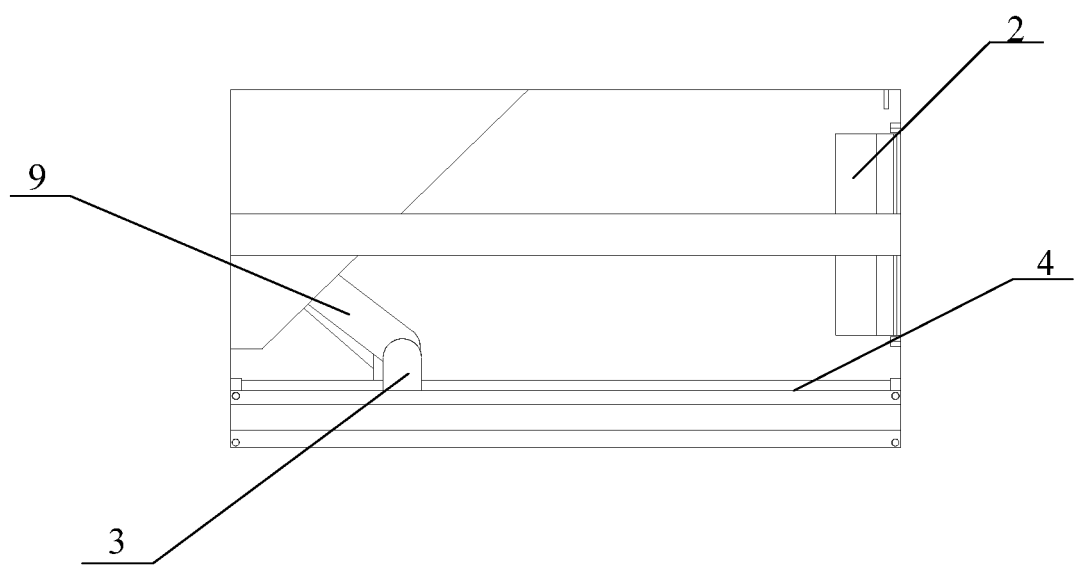
FIG. 2 is a right view of the battery locking device for the new energy vehicle according to an embodiment of the present application.

Referring to FIG. 1 and FIG. 2, FIG. 1 is an overall schematic diagram of a battery locking device for a new energy vehicle according to an embodiment of the present application, and FIG. 2 is a right view of the battery locking device for the new energy vehicle according to the embodiment of the present application.

The battery clamping device in the battery locking device for the new energy vehicle according to the present embodiment includes two pressing plate linkage mechanisms provided on two sides of the battery inlet 12, and each of the two pressing plate linkage mechanisms is located at one side of the two sides of the battery inlet 12. The linkage of the battery pressing plates is achieved by a transmission gear on a transmission rod 10.

Each pressing plate linkage mechanism includes a rotatable screw rod 5, a sliding rod 4, a sliding sleeve 3, a pressing plate and a connecting rod 9. The screw rod 5 is provided on the bottom plate or on the part of the side frame which is located on one of the two sides of the battery inlet 12. The screw rod 5 is located within the battery compartment and is near to a side adjacent to the battery inlet 12, such that it will not interfere with the pushing-in or pulling-out of the battery. The screw rod 5 is provided with a screw rod gear engaged with the transmission gear. The screw rod gear may be provided at an end portion of the screw rod 5 or other positions of the screw rod 5, such that it will not interfere with the pushing-in or pulling-out of the battery and can engage with the transmission gear to thereby achieve the power transmission between the two sides. Among the screw rods 5 at the two sides, at least one of the screw rods 5 is provided with a linkage mechanism operating end 11. The sliding rod 4 is in proximity to the screw rod 5 and is fixedly provided on the battery compartment. The sliding rod 4 is next to the screw rod 5 and may be mounted on the bottom plate or the side frame. The sliding sleeve 3 is sleeved on the screw rod 5 through a threaded orifice and is sleeved on the sliding rod 4 through a sliding rod-through hole simultaneously. Therefore, the sliding sleeve 3 can be moved forward and backward along the screw rod 5 and the sliding rod 4 while the screw rod 5 is rotated. The pressing plate is provided with a pressing edge for pressing the battery. The pressing plate is slidably mounted on the part of the side frame at one corresponding side of the battery inlet 12 through a pressing plate slideway through which the pressing plate is movable upwards and downwards. The slideway may be a vertical slideway perpendicular to the bottom plate or an inclined slideway. In practice, a steel plate having a slideway may be mounted on the side frame, and the pressing plate is mounted on the slideway of the steel plate. One end of the connecting rod 9 is articulated with the pressing plate and the other end thereof is articulated with the sliding sleeve 3.

The sliding sleeve 3 located at the same side with the linkage mechanism operating end 11 can be moved forward and backward on the screw rod 5 along the sliding rod 4 by rotating the linkage mechanism operating end 11. The movement of the sliding sleeve 3 will be transmitted to the pressing plate located at the same side of the side frame with the sliding sleeve 3 via the connecting rod 9, and thus the pressing plate will be moved downwards or upwards along the slideway. Meanwhile, the rotation of the screw rod 5 is transmitted to the screw rod 5 at the other side through the engagement between the screw rod gear and a transmission rod gear, and thus the screw rod 5 on the other side of the side frame is rotated, therefore the pressing plate located at the same side with the screw rod 5 on the other side of the side frame is driven to move downwards or upwards. Thereby the battery is clamped or released.

Figure 3:
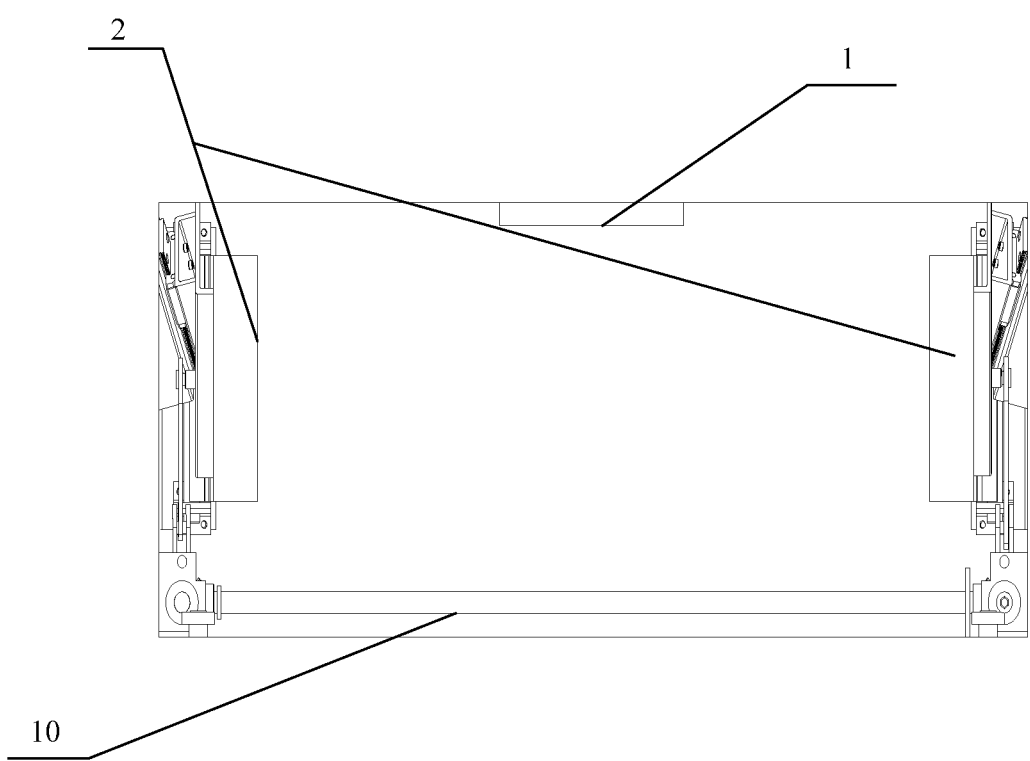
FIG. 3 is a front view of the battery locking device for the new energy vehicle according to an embodiment of the present application.

Referring to FIG. 1 and FIG. 3, FIG. 1 is an overall schematic diagram of a battery locking device for a new energy vehicle according to an embodiment of the present application, and FIG. 3 is a front view of the battery locking device for the new energy vehicle according to the embodiment of the present application.

For further improving technical solutions provided by the present application, the present embodiment further includes: a back stop member 1 mounted on the part of the side frame at the back side of the battery department for preventing the battery from being exposed, and side stop members 2 provided on two sides of the battery inlet 12 and located on the part of the side frame at the back side of the battery compartment. During the locking of the battery, the battery is clamped by the back stop member 1, the side stop members 2 and the battery pressing plates at the two sides simultaneously, which effectively avoids the shaking of the battery.

For further improving the above solution, in the present embodiment, the back stop member 1 and the side stop member 2 are angle steels which have an inner angle of 90 degree and are rotatably connected to the side frame, and springs are provided between the back stop member and the side frame as well as between each side stop member 2 and the side frame. With such a structure, even if the battery is slightly moved, the back stop member 1 and the side stop members 2 can be adjusted by themselves such that they are in close contact with the battery, which thereby can avoid a misplacement of the battery with respect to the stop member.

Preferably, in the present embodiment, one end of the pressing plate slideway is in proximity to the top side of the battery compartment, and the other end thereof is inclined downwards and towards the back side of the battery compartment. The battery pressing edge includes an upper pressing edge 7 for pressing the upper surface of the battery and a front pressing edge 8 for pressing the front surface of the battery. With such kind of slideway, a downward force and a backward force can be applied to the battery when the battery is pressed by the pressing plate, such that the top surface of the battery is pressed by the upper pressing edge 7 and the front surface of the battery is pressed by the front pressing edge 8, which therefore can prevent the battery from sliding out through the battery inlet, and thus the battery clamping device is more safe and reliable.

For convenience of arrangement, in the present embodiment, transmission gears are provided on both ends of the transmission rod, and the screw rod gear engaged with corresponding transmission gear is provided on the end of the screw rod 5 protruded to the back side of the battery compartment. And for convenience of operation, the linkage mechanism operating end 11 is provided at the same side of the battery compartment with the battery inlet 12, as shown in FIG. 1.

In order that the battery can be pushed into the battery compartment easily, in the present embodiment, pushing guide wheels 6 are provided on the bottom plate of the battery compartment. The pushing guide wheels 6 are located at both sides of the battery inlet 12, with each side of the battery inlet 2 being provided with one or more pushing guide wheels 6, such that the battery can be conveniently pushed into the battery compartment.

In order to prevent surfaces of the battery from being worn out and to reduce the noise of the vehicle, in the present embodiment, it is preferable that the back stop member 1, the side stop members 2 and the pressing edges of the pressing plates are provided with elastic buffering members. The elastic buffering member should be a rubber member having a large friction force or a buffering member made from other buffering materials which meet with the requirements.

It is further provided according to the present application a new energy vehicle fitted with the above battery locking device, with which vehicle, the battery can be replaced rapidly and simply.

Herein, specific examples are utilized to illustrate the principle and embodiments of the present application, and the description of the embodiments is merely used to help to understand the method of the present application and the core concept thereof. It should be noted that, for those skilled in the art, many improvements and modifications may be made to the present application without departing from the principle of the present application, which improvements and modifications also fall into the protection scope of the claims of the present application.

The invention claimed is:

1. A battery locking device for a new energy vehicle, comprising
   a battery compartment fit for a battery, the battery compartment being provided with a battery inlet;

a battery clamping device provided on the battery compartment and controlled by a linkage mechanism such that the battery is clamped or released; and pushing guide wheels located at the two sides of the battery inlet and provided on a bottom plate;

wherein the battery compartment comprises a side frame and the bottom plate provided at a bottom portion of the side frame and the battery clamping device comprises two pressing plate linkage mechanisms provided on two sides of the battery inlet and a transmission rod connecting the pressing plate linkage mechanisms, wherein the transmission rod is provided with a transmission gear, and the pressing plate linkage mechanisms comprise:

rotatable screw rods provided on parts of the side frame that are located at the two sides of the battery inlet or on the bottom plate, wherein each rotatable screw rod is provided with a screw rod gear engaged with a transmission gear on the transmission rod, and an end of at least one of the screw rods is used as a linkage mechanism operating end;

sliding rods, each of which is in proximity to corresponding screw rod and is fixedly provided on the battery compartment;

sliding sleeves, each of which is sleeved on corresponding screw rod through a threaded orifice and is sleeved on corresponding sliding rod through a sliding rod-through hole simultaneously;

pressing plates, each of which is provided with a pressing edge for pressing the battery, slidably mounted on the parts of the side frame that are located at the two sides of the battery inlet via pressing plate slideways through which the pressing plates are movable upwards and downwards; and connecting rods, one end of each connecting rod is articulated with corresponding pressing plate, and the other end thereof is articulated with corresponding sliding sleeve.

2. The battery locking device for the new energy vehicle according to claim 1, further comprising: a back stop member mounted on a part of the side frame that is located at a back side of the battery compartment, for preventing the battery from being exposed; and side stop members provided at two sides of the battery inlet and located at the part of the side frame that is located at the back side of the battery compartment.

3. The battery locking device for the new energy vehicle according to claim 2, wherein the back stop member and the side stop members are angle steels which have an inner angle of 90 degree and are rotabaly connected to the side frame, and springs are provided between the back stop member and the side frame as well as between each side stop member and the side frame.

4. The battery locking device for the new energy vehicle according to claim 1, wherein one end of each pressing slideway is in proximity to a top side of the battery compartment, and the other end thereof is extended downwards and inclined towards the back side of the battery compartment, and the pressing edge of the pressing plate comprises an upper pressing edge for pressing an upper surface of the battery and a front pressing edge for pressing a front surface of the battery.

5. The battery locking device for the new energy vehicle according to claim 1, wherein transmission gears are provided on both ends of the transmission rod, the screw rod gear is provide on an end of the screw rod protruded to the back side of the battery compartment, and the linkage mechanism operating end is provided at one side of the battery inlet.

6. The battery locking device for the new energy vehicle according to claim 3, further comprising elastic buffering members provided on the back stop member, the side stop members and pressing edges of the pressing plates.

7. A new energy vehicle, comprising a battery and a battery locking device for accommodating and locking the battery, wherein the battery locking device is a battery locking device according to claim 1.

* * * * *